United States Patent [19]

Albrecht

[11] Patent Number: 4,833,221

[45] Date of Patent: May 23, 1989

[54] METHOD FOR POLYMERIZING A METHYL METHACRYLATE MOLDING COMPOSITION

[75] Inventor: Klaus Albrecht, Mainz, Fed. Rep. of Germany

[73] Assignee: Röhm GmbH, Darmstadt, Fed. Rep. of Germany

[21] Appl. No.: 92,207

[22] Filed: Sep. 2, 1987

[30] Foreign Application Priority Data

Sep. 19, 1986 [DE] Fed. Rep. of Germany ....... 3631826

[51] Int. Cl.$^4$ .............................................. C08F 2/00
[52] U.S. Cl. ........................................ 526/64; 526/78; 526/208; 526/216; 526/232.3; 526/272
[58] Field of Search ..................... 526/271, 272, 307.8, 526/64, 78, 208, 216, 232.3

[56] References Cited

U.S. PATENT DOCUMENTS 3,252,950  5/1966  Terenzi et al. ..................... 260/80.5
3,336,267  8/1967  Zimmerman et al. ............... 526/272

FOREIGN PATENT DOCUMENTS 0113105   7/1984  European Pat. Off. .
1231013  12/1966  Fed. Rep. of Germany .
1298272   6/1969  Fed. Rep. of Germany .
60-147417  8/1985  Japan .

OTHER PUBLICATIONS

Chemical Abstracts, vol. 102 (1985) 150317.

Primary Examiner—C. Warren Ivy
Assistant Examiner—Alex H. Walker
Attorney, Agent, or Firm—Curtis, Morris & Safford

[57] ABSTRACT

A two step method for making a thermoplastic molding composition predominantly comprising methyl methacrylate by polymerizing monomers in a first stage, in the presence or absence of a solvent, to 50 percent conversion, further polymerizing at 75° C. to 150° C. in a second stage in the presence of a nonpolymerizable organic solvent to a conversion of at least 80 percent, and then evaporating volatile constituents.

24 Claims, No Drawings

METHOD FOR POLYMERIZING A METHYL METHACRYLATE MOLDING COMPOSITION

The present invention relates to an improved method for making a molding composition from methyl methacrylate, an aromatic vinyl compound, and maleic anhydride, particularly in continuous operation.

Molding compositions comprising these components are distinguished by a higher heat distortion point (deflection temperature) and a lower susceptibility to stress cracking than are polymethyl methacrylate molding compositions.

THE PRIOR ART

It is known from published German Patent Application DE-AS No. 1,231,013 to make from the aforesaid monomers a molding composition which is resistant to boiling water and exhibits little tendency to crack under the stresses of alternating exposure to hot and cold water. Polymerization is carried out batchwise in bulk, which is not particularly desirable for the commercial production of this molding composition.

A similar molding composition is known from published German Patent Application DE-AS No. 1,298,272. It is likewise produced by bulk polymerization. The production of such a molding composition by bulk polymerization is described also in European Pat. No. 113,105. As an alternative, bead polymerization of a partly polymerized monomer mixture in an aqueous phase is proposed, which, however, has its drawbacks in view of the susceptibility of maleic anhydride to hydrolysis.

In Japanese Pat. No. 85/147,417, a monomer mixture of methyl methacrylate, an aromatic vinyl compound, and maleic anhydride is dissolved in an organic solvent and polymerized to 40 to 70 percent conversion at temperatures ranging from 100° C. to 180° C. The molding composition is recovered from the polymer solution by evaporation of the solvent and of the residual monomers. The molding composition obtained has an undesirably low reduced viscosity, a relatively high residual content of unpolymerized maleic anhydride, and an objectionable yellow cast.

THE OBJECT AND THE INVENTION

The object of the invention is to provide a method for making a molding composition from a monomer mixture of:

from 60 to 90 percent by weight of methyl methacrylate, from 5 to 25 percent by weight of at least one aromatic vinyl compound, from 2.5 to 15 percent by weight of maleic anhydride, and from 0 to 5 percent by weight of a lower alkyl acrylate by free radical polymerization in which the polymerization mixture remains in a free flowing state until polymerization is completed, and which method avoids drawbacks of the prior art processes such as an excessively low reduced viscosity, a high residual monomer content, and discoloration.

In accordance with the present invention, this object is accomplished by carrying out the polymerization in the presence or absence of a nonpolymerizable organic solvent to a conversion of up to 60, preferably up to 50 percent by weight, continuing the polymerization from said conversion to a conversion of at least 80 percent by weight in the temperature range from 75° C. to 150° C. or, if an alpha-alkyl styrene such as alpha-methylstyrene is used as an aromatic vinyl compound, to 130° C., in the presence of an organic solvent, and then evaporating the volatile constituents.

The method of the invention yields a non-colored molding composition having a reduced viscosity in the range from 50 to 90 ml/g, and preferably from 60 to 80 ml/g. The residual monomer content is less than 0.6 percent by weight. Of particular importance is that the content of maleic anhydride, which is difficult to remove after polymerization, is less than 0.1 weight percent, which is tolerable.

The nonuniformity of the copolymer composition and of the molecular weight of the polymer produced in accordance with the invention is less than that of a bulk polymer with the same composition and the same weight average molecular weight. The polydispersity ($M_W/M_N$) ranges from 1.8 to 2.0, for example. Similarly, the melt viscosity is decreased and processability is improved. This latter manifests itself in a lower processing temperature and in improved mechanical properties.

PRACTICE OF THE INVENTION

An organic solvent may be used already in the first polymerization stage. However, since the polymerization mixture remains free flowing anyway up to a conversion of 60 percent, the solvent is preferably added only in the second stage. Its amount should be such that the reaction mixtures is still free flowing at the polymerization temperature when the final conversion level is reached. This can be accomplished with a solvent content between 20 and 50 percent, for example, and more particularly between 25 and 40 percent, by weight of the polymerization mixture.

The solvent advantageously has a boiling point lower than that of the monomer mixture. The boiling point of the solvent at normal pressure is preferably in the range from 80° C. to 150° C. In practice, inexpensive nontoxic solvents are used which are largely inert under the process conditions and which have a low transfer constant. Illustrative of these are mononuclear aromatic hydrocarbons such as benzene, toluene, or xylene; aliphatic esters such as methyl, ethyl, propyl or butyl acetate, propionate or butyrate; and aliphatic ketones such as methylethyl ketone or diethyl ketone. Esters having not more than 8 carbon atoms are preferred.

The monomer mixture comprises from 60 to 90 percent by weight of methyl methacrylate. To improve rheological properties, alkyl acrylates having up to 6 carbon atoms in the alkyl group may be used concurrently in an amount up to 5 percent. Lower alkyl groups having up to 4 carbon atoms are preferred.

Suitable aromatic vinyl compounds have the formula

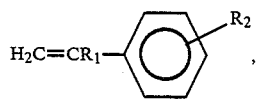

wherein $R_1$ and $R_2$ are, independently, each hydrogen or lower alkyl, preferably methyl, and $R_2$ is preferably in the paraposition. Exemplary preferred compounds include, in particular, styrene, para-methylstyrene, and alpha-methylstyrene. Compounds wherein $R_1$ is hydrogen, such as styrene and para-methylstyrene, offer the advantage of permitting fast polymerization. On the other hand, compounds wherein $R_1$ is alkyl, such as alpha-methylstyrene, because of their pronounced depolymerization tendency, have to be incorporated into the polymer chain at a lower temperature and thus more slowly. However, while the addition of styrene will increase the heat distortion point only about 10° C. to 15° C. above that of polymethylmethacrylate, to i.e. 120° C. to 123° C., a composition produced with the same quantity of alpha-methylstyrene will have a significantly higher heat distortion temperature of about 130° C. to 135° C.

The polymerization is initiated conventionally with initiators forming free radicals; however, it can be carried out also purely thermally at a slower rate. As a rule, a one-time addition of initiator before the start of polymerization will suffice, the initiator being selected so that adequate free radical formation occurs up to the completion of polymerization. Examples of suitable initiators are dilauroyl peroxide, tert.-butyl peroctoate, and tert-butyl peroxyisononanoate. However, polymerization in the first stage may also be started with an initiator having a shorter half-life, for example, tert.-butyl peroxyneodecanoate, and an initiator with a longer half-life, such as 2,2-bis-(tert.-butyl peroxy)-butane, may then be added before the start of the second stage. The amounts of initiator generally range from 0.02 to 2 percent by weight of the polymerization mixture. If styrene is used as an aromatic vinyl compound, a chain transfer agent such as dodecyl mercaptan is also preferably used. The amount of chain transfer agent may range from about 0.1 to 0.5 percent by weight.

The polymerization temperature is coordinated with the type and amount of the initiator used in such a way that the desired final conversion level is obtained and the polymer produced has the desired reduced viscosity. As a rule, the polymerization temperature will range from 75° C. to 150° C. throughout the process. If lower temperatures are used in the first stage, the polymerization will proceed at an undesirably slow rate. When the polymerization is carried out at atmospheric pressure, which is preferred, it is advisable not to exceed a temperature of 110° C., at least in the first stage. If alpha-methylstyrene is used concurrently, it will be advantageous to avoid temperatures above 100° C.

In the second process stage, a monomer conversion of at least 80 percent by weight must be obtained. Preferably as nearly complete conversion as possible is sought, that is to say at least 90 percent by weight, and more particularly 95 to 100 percent by weight, conversion. This will do away with the need for distilling off large amounts of unreacted monomers along with the solvents on completion of the polymerization, which always poses the risk of discoloration.

For the first process stage, a conventional stirred-tank reactor with heating and cooling means will be satisfactory. The same reactor can also be employed in the second stage if the polymerization mixture remains sufficiently stirrable in the presence of a large amount of solvent.

The process is preferably carried out continuously. A stirred-tank reactor with continuous through-flow is then advantageously used and the residence time is adjusted so that a conversion of 50 weight percent is not exceeded. The conversion in the first stage preferably ranges from 35 to 60 percent by weight. It is preferable to operate the first reactor without a solvent and first to add the solvent in a mixing tank with continuous through-flow to the polymerization mixture-emerging from the first reactor. An upright tubular (column) reactor designed for continuous downward flow and preferably not equipped with an agitating device is suitable for use in the second process stage. In the preferred mode of operation, boiling conditions prevail in the upper region of the column reactor and the evaporating components are recycled to the polymerization mixture by means of a reflux condenser set onto the reactor. Boiling results in backmixing in the polymerization mixture in the upper part of the column reactor as well as in effective heat dissipation which ceases as conversion in the lower part progresses. However, there is less backmixing in such a tubular reactor than in a stirred-tank reactor, and the continuous process is preferably carried out with less backmixing in the second stage than in the first stage. To keep the polymerization mixture free flowing (i.e. <1000 Pa s), the temperature in the column reactor may be allowed to increase from top to bottom within the limits mentioned earlier. In continuous operation, a uniform temperature is maintained in both reactors by external cooling.

After the final conversion level has been reached, the solvent contained in the polymer solution and any residual amounts of volatile monomers still present are evaporated. A vented extruder which in continuous operation is connected to the lower outlet opening of the column reactor is suitable for this purpose. There the composition is conveyed conventionally by means of one or more screws through one or more decompression zones, wherein the volatile components are evaporated at a temperature at which the molding composition is in a molten state. At least one such decompression zone should be operated at subatmospheric pressure, for example, at 10 to 100 millibars. The operating temperature of the vented extruder will usually rise from the inlet to the outlet from about 220° C. to 270° C. At the outlet end, the molten strand of molding composition can be taken off, cooled, and granulated or processed into a shaped body.

A better understanding of the present invention and of its many advantages will be had from the following Examples, given by way of illustration.

EXAMPLES 1 TO 13

Discontinuous Operation

Under an argon inert atmosphere, a reaction mixture of methyl methacrylate, styrene or alpha-methylstyrene, maleic anhydride, toluene or butyl acetate (Example 4) as a solvent, di-tert.-butyl peroxide or bis-(tert.-butyl peroxy)butane as an initiator, and optionally dodecyl mercaptan as a chain transfer agent are charged to a 3-liter stirred vessel having a reflux condenser and are heated to a reaction temperature from 90° C. to 110° C. The quantities and reaction conditions are given in Tables 1 and 2. After a monomer conversion from 83 to 100 percent, the solvent is removed from the reaction mixture in a screw evaporator, leaving a molten molding composition.

In Example 9, the solvent is added only after 8 hours at 45.5 percent conversion. Tables 1 and 2 give the reduced viscosities and the Vicat softening points of the polymers obtained as well as their residual monomer and solvent contents.

TABLE 1

Reaction mixture: 450 g toluene, 735 g methyl methacrylate (MMA), 157.5 g styrene, 105 g maleic anhydride, 2.6 g dodecyl mercaptan

| Example | Polymerization temperature °C. | Di-tert-butyl peroxide % | Reaction time, hours | Conversion % | Reduced viscosity ml/g | Vicat softening point °C. | Residual monomer and solvent content, wt. % |
|---|---|---|---|---|---|---|---|
| 1 | 90 | 0.42 | 12 | >99 | 65 | 120 | >0.5 |
| 2 | 90 | 0.14 | 20 | 83 | 63 | 119 | >0.5 |
| 3 | 100 | 0.07 | 18 | 94 | 68 | — | >0.5 |
| 4 | 108 | 0.07 | 8 | 97 | 48 | — | >0.5 |
| 5 | 108 | 0.035 | 20 | 96 | 51 | 121 | 0.025 MMA + maleic anhydride 0.28 toluene |
| 6* | 111 | 0.07 | 8 | 100 | 70 | 120 | 0.07 MMA + maleic anhydride 0.6 butyl acetate |
| 7 | 110 | 0.07 | 14 | 100 | 67 Melt viscosity 2500 Pa/sec (220° C./5N) | 121 | 0.011 MMA 0.014 maleic anhydride 0.28 toluene |

*Butyl acetate (boiling point 126.5° C.) in place of toluene as the solvent

TABLE 2

| Example | Toluene | MMA | St | MSt | MAH | MA | Initiator* | | Temp. °C. | Reaction time, hours | Conversion % | Reduced viscosity cm³/g | Vicat softening point, °C. | Residual monomer (Mon) and toluene (Tol) content, wt. % |
|---|---|---|---|---|---|---|---|---|---|---|---|---|---|---|
| 8 | 30 | 76 | 1 | 15 | 8 | — | 0.07 | BPB | 100 | 24 | 97 | 63 | 131 | >0.5 |
| 9 | 30*** | 76 | 1 | 15 | 8 | — | 0.07 | BPB | 95 | 26 | 100 | 72 | 132 | >0.5 |
| 10** | 30 | 90 | 5 | — | 2.5 | 2.5 | 0.035 | DBP | 95 | 31 | 97 | 64 | 110 | 0.05 Mon 0.34 Tol |
| 11 | 30 | 70 | 10 | 10 | 10 | — | 0.07 | BPB | 95 | 23 | 99 | 78 | 130 | 0.15 Mon 0.26 Tol |
| 12** | 30 | 60 | 25 | — | 15 | — | 0.049 | DBP | 95 | 25 | 98 | 54 | 129 | 0.037 Mon 0.28 Tol |
| 13 | 30 | 60 | 5 | 20 | 10 | 5 | 0.1 | BPB | 95 | 72 | 98 | 56 | 126 | 0.22 Mon 0.29 Tol |

*Key to abbreviations:
MMA = Methyl methacrylate
St = Styrene
MSt = alpha-Methylstyrene
MAH = Maleic anhydride
BBP = bis-(tert-Butylperoxy)butane
DBP = di-tert-Butyl peroxide
MA = Methyl acrylate
**0.35 part by weight n-dodecyl mercaptan
***Add toluene after 8 hours

EXAMPLE 14

Continuous Operation in Two Stages

A mixture of 75 parts by weight of methyl methacrylate, 15 parts of styrene, 10 parts of maleic anhydride, 0.04 part of di-tert-butyl peroxide, and 10 parts of toluene is introduced as a continuous stream into a heated stirred vessel, the quantity with which it is filled being coordinated with the feed and discharge rates in such a way that the dwell time of the reaction mixture is 20 hours. At a polymerization temperature of 95° C., conversion becomes a constant 50 percent. A volume of the polymer syrup formed which corresponds to the volume of the feed is continuously withdrawn from the reactor and fed to the top of an upright tubular reactor having a heating jacket and with a reflux condenser set onto it. In the upper part of the tubular reactor, the reaction mixture boils with reflux. After a dwell time of 10 hours at 100° C. to 110° C., a conversion of over 97 percent is obtained. The reaction mixture is taken off at the lower end of the tubular reactor and moved by means of a gear pump to a screw evaporator for evaporation of its volatile constituent. The discharged polymer has a reduced viscosity of 61 ml/g and a Vicat softening point of 123° C. and contains 0.06 percent by weight of residual monomers and 0.27 percent of toluene.

EXAMPLE 15

Continuous Operation in Two Stages With Solvent Addition in the Second Stage

The same unit is used as in Example 14; however, a static mixer is interposed ahead of the tubular reactor. A mixture of 76 parts by weight of methyl methacrylate, 1 part of styrene, 15 parts of alpha-methylstyrene, 8 parts of maleic anhydride, and 0.04 part of bis-(tert.-butyl peroxy) butane is fed continuously to the reactor and, after a dwell time of 140 minutes at 100° C. with a constant conversion of 35 to 40 percent is continuously withdrawn. 30 parts of toluene and 0.02 part of the initiator are continuously added per 100 parts of the polymer syrup withdrawn and during its passage through the static mixer the syrup is homogeneously mixed and then conducted to the tubular reactor for further polymerization. After a dwell time of 15 hours, the reaction mixture, converted to the extent of 97 percent, is freed of volatile constituents and yields a molding composition with a reduced viscosity of 66 ml/g, a Vicat softening point at 131° C., a residual monomer content of 0.07 percent, and a residual toluene content of 0.32 percent.

What is claimed is:

1. A method for making a molding composition which comprises polymerizing a monomer mixture of from 60 to 90 percent by weight of methyl methacrylate, from 5 to 25 percent by weight of at least one aromatic vinyl compound of the formula,

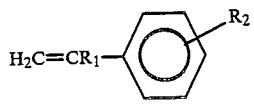

wherein $R_1$ and $R_2$ are, independently, each hydrogen or lower alkyl, from 2.5 to 15 percent by weight of maleic anhydride, and from 0 to 5 percent by weight of an alkyl acrylate in a first stage in the absence of a nonpolymerizable organic solvent to a conversion 35 to 60 percent by weight, continuing to polymerize said mixture in a second stage in the presence of an organic solvent to a conversion of at least 80 percent by weight at a temperature from 75° C. to 150° C. if $R_1$ is hydrogen or, at a temperature from 75° C. to 130° C. if $R_1$ is lower alkyl, and then evaporating volatile constituents from the product.

2. A method as in claim 1 wherein $R_1$ and $R_2$ are, independently, each hydrogen or methyl and $R_2$ is in the para-position.

3. A method as in claim 2 wherein polymerization is continued in said second stage to a conversion of at least 90 percent by weight.

4. A method as in claim 2 wherein polymerization is continued in said second stage to a conversion from 95 to 100 percent by weight.

5. A method as in claim 2 wherein said organic solvent is present in said second stage in an amount such that the reaction mixture is still free flowing at the polymerization temperature when the final conversion level is reached.

6. A method as in claim 5 wherein said organic solvent is present in said second stage in an amount from 20 to 50 percent by weight of the reaction mixture.

7. A method as in claim 2 wherein said organic solvent has a boiling point between 80° C. and 150° C.

8. A method as in claim 7 wherein said solvent is an aliphatic ester, an aliphatic ketone, or an aromatic hydrocarbon.

9. A method as in claim 2 performed continuously.

10. A method as in claim 9 wherein there is less backmixing in said second stage than in said first stage.

11. A method as in claim 2 wherein 2,2-bis(tert.-butylperoxy)butane is used to initiate polymerization.

12. A method as in claim 1 wherein polymerization is conducted with stirring in said first stage and without stirring in said second stage.

13. A method as in claim 1 wherein polymerization is conducted with stirring in both said first and second stages.

14. A method for making a molding composition which comprises polymerizing a monomer mixture of
from 60 to 90 percent by weight of methyl methacrylate,
from 5 to 25 percent by weight of at least one aromatic vinyl compound of the formula

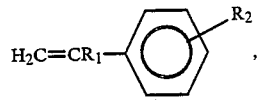

wherein $R_1$ and $R_2$ are, independently, each hydrogen or lower alkyl, from 2.5 to 15 percent by weight of maleic anhydride, and from 0 to 5 percent by weight of an alkyl acrylate in a first stage, with stirring, in the presence of a nonpolymerizable organic solvent to a conversion of 35 to 60 percent by weight, continuing to polymerize said mixture in a second stage, without stirring, in the presence of said organic solvent to a conversion of at least 80 percent by weight at a temperature from 75° C. to 150° C. if $R_1$ is hydrogen or at a temperature from 75° C. to 130° C. if $R_1$ is lower alkyl, and then evaporating volatile constituents from the product.

15. A method as in claim 14 wherein $R_1$ and $R_2$ are, independently, each hydrogen or methyl and $R_2$ is in the paraposition.

16. A method as in claim 15 wherein polymerization is continued in said second stage to a conversion of at least 90 percent by weight.

17. A method as in claim 15 wherein polymerization is continued in said second stage to a conversion from 95 to 100 percent by weight.

18. A method as in claim 15 wherein said organic solvent is present in said second stage in an amount such that the reaction mixture is still free flowing at the polymerization temperature when the final conversion level is reached.

19. A method as in claim 18 wherein said organic solvent is present in said second stage in an amount from 20 to 50 percent by weight of the reaction mixture.

20. A method as in claim 15 wherein said organic solvent has a boiling point between 80° C. and 150° C.

21. A method as in claim 20 wherein said solvent is an aliphatic ester, an aliphatic ketone, or an aromatic hydrocarbon.

22. A method as in claim 15 performed continuously.

23. A method as in claim 22 wherein there is less backmixing in said second stage than in said first stage.

24. A method as in claim 15 wherein 2,2-bis-(tert.-butylperoxy)butane is used to initiate polymerization.

* * * * *

UNITED STATES PATENT AND TRADEMARK OFFICE
CERTIFICATE OF CORRECTION

PATENT NO. : 4,833,221
DATED : May 23, 1989
INVENTOR(S) : Klaus Albrecht

It is certified that error appears in the above-identified patent and that said Letters Patent is hereby corrected as shown below:

Table 1, Examples 1 - 4, under the column heading "Residual monomer and solvent content, wt.%", replace " $>$ 0.5" by -- $<$ 0.5 --.

Table 2, under the column heading "Residual monomer (Mon) and toluene (Tol) content, wt.%", in Examples 8 and 9 replace " $>$ 0.5" by -- $<$ 0.5 -- and in Example 11 replace "0.15" by -- 0.15 Mon --.

Column 7, line 18 (as numbered), after "conversion" insert -- of --.

Signed and Sealed this

Eleventh Day of September, 1990

Attest:

HARRY F. MANBECK, JR.

*Attesting Officer*    *Commissioner of Patents and Trademarks*